United States Patent [19]

Graham, Jr. et al.

[11] 4,436,631

[45] * Mar. 13, 1984

[54] MULTIPLE PARTICLE WASHING SYSTEM AND METHOD OF USE

[75] Inventors: Henry A. Graham, Jr., Annandale; Johnna B. Hawk, Rocky Hill; Rosemary K. Chachowski, Manville, all of N.J.

[73] Assignee: Ortho Diagnostic Systems Inc., Raritan, N.J.

[*] Notice: The portion of the term of this patent subsequent to Mar. 6, 2001 has been disclaimed.

[21] Appl. No.: 427,022

[22] Filed: Sep. 29, 1982

Related U.S. Application Data

[63] Continuation-in-part of Ser. No. 290,267, Aug. 5, 1981.

[51] Int. Cl.³ .............................................. B01D 21/26
[52] U.S. Cl. .................................... 210/772; 210/782; 210/927; 210/DIG. 24; 210/518; 73/864.01; 422/100
[58] Field of Search ............... 210/DIG. 24, 927, 782, 210/359, 516, 517, 518; 422/101, 100, 102; 436/177, 772; 73/864.01

[56] References Cited

U.S. PATENT DOCUMENTS

| | | | |
|---|---|---|---|
| 2,097,571 | 11/1937 | Horan | 422/100 |
| 2,972,889 | 2/1961 | Offutt | 73/864.01 |
| 3,075,694 | 1/1963 | Anderson | 233/40 |
| 3,141,336 | 7/1964 | Oates | 422/100 |
| 3,677,710 | 7/1972 | Hirsch | 23/258.5 |
| 3,687,296 | 8/1972 | Spinosa et al. | 210/406 |
| 3,799,342 | 3/1974 | Greenspan | 210/73 |
| 3,846,077 | 11/1974 | Ohringer | 422/102 |
| 3,858,795 | 1/1975 | Joyce | 233/14 R |
| 3,914,985 | 10/1975 | Von Behrens | 73/61.4 |
| 3,932,277 | 1/1976 | McDermott et al. | 210/77 |
| 3,953,172 | 4/1976 | Shapiro et al. | 23/230 R |
| 3,960,727 | 6/1976 | Hochstrasser | 210/78 |
| 4,035,294 | 7/1977 | Landers et al. | 210/77 |
| 4,158,547 | 6/1979 | Rousseau et al. | 23/230.6 |
| 4,210,156 | 7/1980 | Bennett | 73/864.01 |
| 4,244,694 | 1/1981 | Farina et al. | 23/230 B |
| 4,255,256 | 3/1981 | Ferrante et al. | 210/731 |
| 4,308,028 | 12/1981 | Elkins | 23/230 B |

Primary Examiner—Charles N. Hart
Assistant Examiner—John W. Czaja
Attorney, Agent, or Firm—Mark A. Hofer

[57] ABSTRACT

A particle washing system and method of use is described wherein in a preferred embodiment the fluid containing the desired particles is placed within an inner tube having near the bottom thereof an orifice with a diameter at least equal to that of the diameter of the particles, and wherein the inner tube is positioned within an outer tube having a fluid with a density at least equal to that of the solution containing the particles to be separated but less than that of the particles. The application of centrifugal force to the particles directed toward the bottom of the outer tube causes the particles to move through the orifice and through the outer solution contained within the outer tube so that the particles are collected from the inner solution, washed by the outer solution, and subsequently sedimented at the bottom of the outer tube.

5 Claims, 11 Drawing Figures

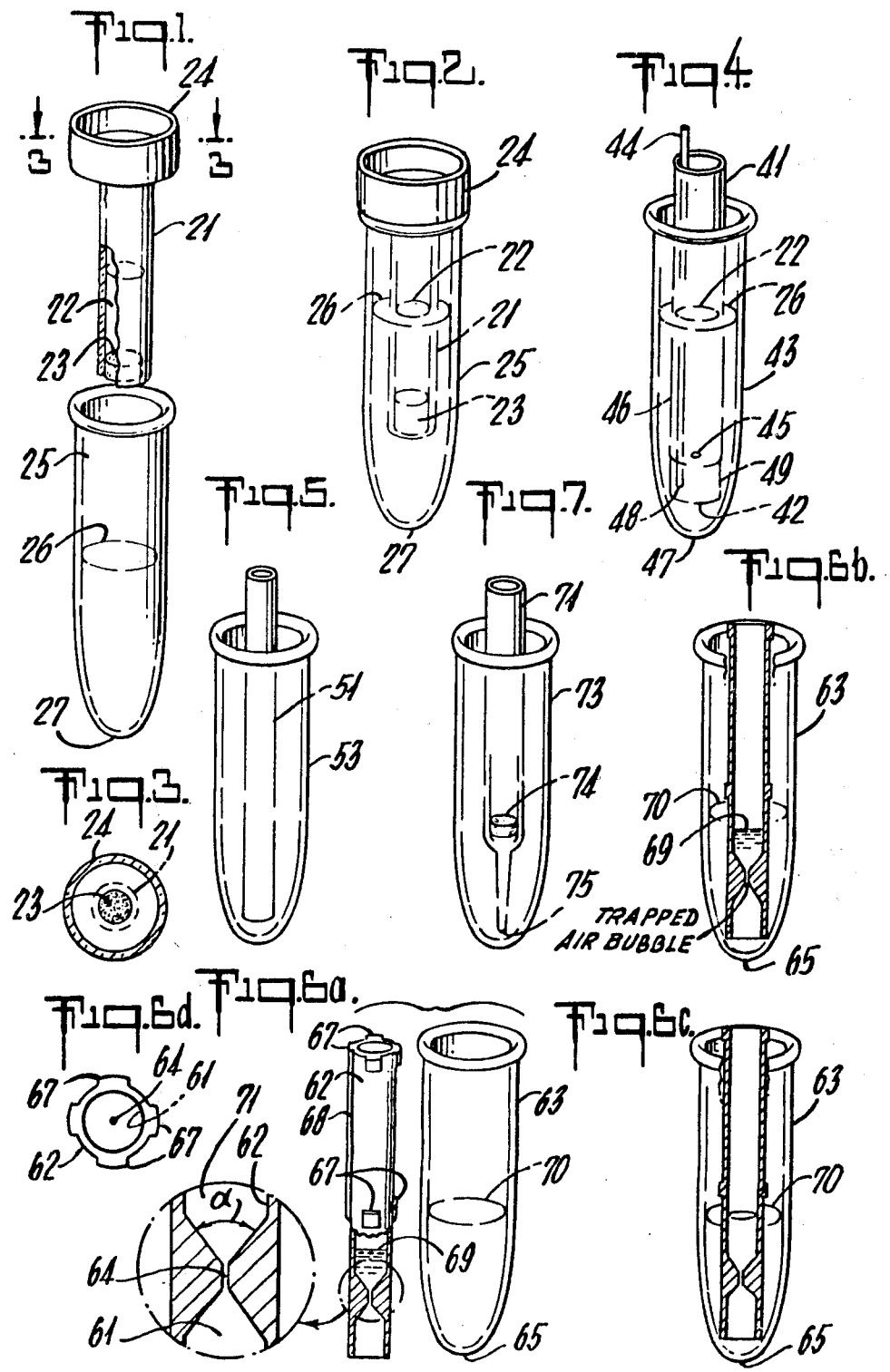

MULTIPLE PARTICLE WASHING SYSTEM AND METHOD OF USE

BACKGROUND OF THE INVENTION

This application is a continuation-in-part application of pending application No. 290,267 filed August 5, 1981.

FIELD OF THE INVENTION

This invention relates to apparatus and methods for the separation, collection and washing of multiple density distinguishable particles contained in a fluid wherein such apparatus and methods are easily adaptable for the handling of large volumes of blood samples and the like.

The necessity and desirability of separating blood samples into their respective component parts, such as the individual cellular components (erythrocytes and leukocytes) and serum, for test purposes and other medical applications has long been recognized. For example, before a transfusion can be given, the recipient's serum must be tested for the presence of antibodies which would react with antigens present on the donor's red blood cells. It has been estimated that this and similar antibody detection procedures, requiring the washing of red blood cells prior to the addition of Coombs serum, is performed in the U.S. about 250 million times each year. These antibody detection tests require combining donor cells with recipient's serum followed by the separation and isolation of the donor's red blood cells from the recipient's serum. It is well known that such a separation can be effected by centrifugation whereby the red blood cells are forced under increased gravitational forces to the bottom of a centrifuge test tube thereby displacing serum and other less dense components to higher levels. In those operations requiring merely the red blood cell layer, typically the serum portion is decanted and the red blood cells are resuspended in a wash solution. Generally, this solution is a salt based solution. Resuspension of cells is generally accomplished by physical agitation so that any serum which may have been trapped in intracellular spaces between the cells upon centrifugation is similarly resuspended into the solution. The solution containing the newly suspended red blood cells is then typically recentrifuged in order to repack the red blood cells together at the bottom of the tube and the supernate with the contaminating serum is again decanted. This operation of centrifugation and resuspension is generally repeated three times in order to maximize the washing of the red blood cells and remove serum which contains gamma globulin and complement components which would interfere with the Coombs Test yet still retain as many cells as possible.

Although the standard recovery system results in a relatively clean population of red blood cells with minimal contamination by other elements present in the blood, there generally is a large loss of red blood cells on the order of 20 to 30 percent because of the numerous physical operations performed upon the red blood cells. Further, due to the nature of the physical operations required, automated procedures are difficult to institute and require complex, cumbersome, and expensive equipment In addition, the standard recovery systems require an average of 5 to 6 minutes per 3 wash cycle of the blood sample which puts an increased load upon personnel and equipment resources when large numbers of samples must be handled.

Although there are many types of separation devices available, typically, they are intended to facilitate recovery of the mother solution portion of the suspension and none is intended to solve the aforementioned problems addressed by the present invention.

U.S. Pat. No. 3,932,277 to McDermott et al., directed to the separation of blood fractions, describes a system of tubes, one insertable into the other, whereby one tube inserts a barrier to separate the serum from the red blood cells after centrifuging in an attempt to prevent the mixing of the cells and the serum during decantation of the serum supernatant. During the insertion of the inner tube whereby the barrier is placed between the aforementioned portions, it is possible to have the serum filtered as it passes into the interior of the inner tube. Thus, this invention is directed towards the recovery of serum and requires great care in the placement of the barrier at the surface of the compacted red blood cell portions so as to avoid inadvertant mixing at that interface. Once in place, the barrier will prevent the removal of the red blood cells upon decantation of the serum. Thus, the barrier defeats a technician interested in working with the red blood cell layer from obtaining that cell layer. Further, the barrier prevents separating and dispensing leukocytes from erythrocytes or other particles of different densities, an object of the present invention.

U.S. Pat. No. 3,799,342 to Greenspan is similar to the '277 patent to McDermott in that it also seeks to place a barrier between the red blood cell layer and the upper serum layer to facilitate removal of the serum and permanent retention of the red blood cells within the centrifugation container. As with the teachings of McDermott, the barrier is to be placed after centrifugation and thus also fails to aid in solving the problems to which the present invention is directed. U.S. Pat. No. 4,035,294 to Landers et al. is similarly directed towards the collection, filtration and removal of the supernate following centrifugation. Landers et al. teach the insertion of an inner tube having a filter mounted at the bottom whereby, with the application of force to the inner tube upon insertion, the supernate is filtered through the membrane and is removably collected in the inner tube. As with the previously described references, the disclosure of Landers et al. teaches an improved method in the filtration and handling of liquid supernate materials and fails to supply needed apparatus and methodology for a superior handling of the separated particles from the solution, an object of the present invention.

U.S. Pat. No. 4,244,694 to Farina et al. describes the use of a reactor/separator device for use in automated solid phase immunoassays. The described device employs a water impermeable disc capable of supporting immunoabsorbents, immobilized antisera, ion exchange resins and other similar materials for reaction with reagents added to the inner tube upon centrifugation. Following the desired reaction, additional centrifugal forces are applied in order to force the aqueous phase through the filter making it water permeable thus permitting separation of desired components. Farina's invention provides a device wherein centrifugal force is employed for the mixing, transference and separation of reactants in a reactor cavity separated from the collection chamber by a water impermeable disc. Such a device fails to solve the problems enumerated above, specifically those related to the collection and washing of single or multiple density particles suspended in a solution where a minimum of steps and a maximization of economy is desired.

Although the collection of the red blood cell component from blood samples has been described, it is to be understood that this was by way of illustration and that the prior art procedures described as well as the present invention are equally applicable to the separation of particles in general from a mother solution by application of gravitational, electrical or magnetic forces.

It is an object of the present invention to permit the rapid separation of particles from a solution in a "one step" operation. It is another objective that during separation of the particles from the solution containing the particles, the particles are washed so as to remove any nonspecific serum coating and to dilute any solute drag. It is yet another object that the original containing solution be separately maintained from the resulting particle concentration to permit the removal of the original mother solution in order to reduce contamination. It is another object to permit the separation of particles having different densities and dispensing at least one of such particle types to the exclusion of the other. It is yet another object to provide apparatus and methods capable of operating with volumes significantly larger than typical test tube volumes. It is still another objective of the present invention that these objectives be accomplished in a simple system capable of economical production and employable within simple, inexpensive centrifuges commonly available. It is still yet another objective that the apparatus and methodology of the present invention be capable of replacing expensive automated cell washers presently available. It is a further objective of the present invention to not only provide methodology whereby the objectives may be accomplished but also devices capable of meeting the desired objectives. These and other objectives will readily become apparent to those skilled in the art in the light of the teachings herein set forth.

SUMMARY OF THE INVENTION

The present invention is directed towards methods and devices, having a washing solution reagent, for permitting the efficient and economical separation of particles contained within a fluid so that during the separation operations, the particles are not only removed from a mother solution but are washed in a second solution in a 'one-step' operation.

The apparatus in its simplest form consists of a hollow, open-ended tube or cylinder placed within a test tube containing a washing solution wherein the hollow tube extends at least above the level of the washing solution while it is supported by the bottom of the test tube. Typically the washing solution is chosen to have a density less than that of the particles to be separated but more than that of the solution containing the particles so as to minimize mixing between the two solutions which diffusion of one solution into the other at the interface of the solutions would be governed by Fick's Law. Consequently, for the systems provided, the wash solution or second fluid has at least one component for adjusting the density of said second fluid selected from the group consisting of sodium chloride, glycine, sugars, serum albumin, natural polymers, natural copolymers, synthetic polymers, synthetic copolymers, dextran and Ficoll TM. Ficoll TM is a Pharmacia brand name of a product which comprises neutral polymers of sucrose typically having a molecular weight of 5,000 or more. The serum albumin may be selected from the group consisting of animal serum albumin and human serum albumin. Serum albumin, to be compatible, cannot have human gamma globulin or human complement.

Ficoll is TM of Pharmacia

The volumes of the washing solution and mother solution are chosen so that the interface between these solutions is contained within the inner hollow tube. Upon the application of centrifugal force, the particles contained within the mother solution, placed within the cavity formed by the hollow inner cylinder, are forced to move through the mother solution towards the bottom of the test tube in accordance with the sedimentation coefficients or Svedberg Units characterizing the particles. Since the hollow interior cylinder is merely resting upon the bottom of the outer test tube, the washing solution is capable of penetrating into and out of the inner hollow cylinder and is consequently, partially displaced. Therefore, upon the addition of the mother solution containing the particles to the interior of the inner tube, an interface between the washing and mother solutions is formed which interface is preferably contained within the inner hollow tube by an appropriate adjustment of fluid volumes. The application of centrifugal force will result in pellitization of the desired particles at the bottom of the test tube. Decantation is then effected by either of two methods. Firstly, the remaining mother solution can be aspirated from the interior of the hollow cylindrical tube followed by extrication of the tube or removed with the inner tube after the top has been sealed off, and then the washing solution is decanted; or secondly, and more simply, the mother solution, hollow cylinder, and outer washing solution can be removed in one decantation step simply by inverting the outer tube.

The system requires an inner tube in order to remove the contaminating mother solution which coats the sides of the walls of the container in which it is placed as well as to effect washing of the particles as they are separated and collected. Without the inner tube, the mother solution would coat the inside walls of the test tube and following decantation and resuspension of the desired particles, the resuspending fluid would be contaminated by the small amounts of mother solution remaining on the walls of the test tube.

In accordance with the principles and objectives of the present invention, a system for the washing and collecting of particles contained in a first fluid is provided comprising a second fluid, having a density at the minimum substantially at least equal to that of the first fluid but not greater than the density of the particles, contained within a first containing means having an open top end and, a second means to be inserted through the open top end of said first container means and into the second fluid for substantially containing and separately maintaining said first fluid from the second fluid and also adapted for permitting the movement of the particles from the first fluid into the second fluid. The system may be further particularized wherein the first means for containing the second fluid is an outer tube having an open top end and a closed bottom end; and wherein the second means for substantially containing and separately maintaining said first fluid is an inner tube having an open top end and an open bottom end dimensioned to be at least partially insertable within the outer tube and also having within the inner tube, fluid flow restrictor means for restricting the flow of said first fluid into said second fluid. In alternative embodiments, the inner hollow cylinder is equipped with a porous baffle or filter type material containing pores having a diameter or size at least equal to 7 microns or the diameter or size of the particles to be separated or, other fluid flow restrictor means for reducing the effect of diffusion and mixing currents between the first or mother solution containing the particles and the second fluid contained within the first test tube containing means.

Alternative embodiments additionally provide a second fluid that is compatible with red blood cells so that the second fluid does not lyse the red blood cells nor interfere with immunological or serological reactions.

Also provided is a method of washing and collecting particles contained within a fluid which together form a first zone comprising the steps of inserting the first zone within a cavity formed by means for substantially maintaining separately the first zone from a second zone having a fluid with a density at the minimum substantially at least equal to the fluid of the first zone and which second zone is contained within receptacle means, applying a force to move the particles from said first zone into and substantially through said second zone; and removing the resulting fluid of the first zone as well as removing the means for separating and the fluid of the second zone.

Also described is a method of washing and collecting particles contained in a first fluid comprising the steps of inserting an inner tube adapted with a fluid flow restrictor means for substantially containing said first fluid into an outer tube containing a second fluid having a density at the minimum at least substantially equal to that of the first fluid, but no greater than that of the particles, adding the first fluid into the inner tube and applying a force directed towards the bottom of said outer tube whereby the particles are caused to move through said fluid flow restrictor means and through said second fluid to the bottom of said outer tube and removing said inner tube, said first fluid and said second fluid.

In a preferred embodiment, the inner tube has a fluid flow restrictor means such as a restricted opening or orifice which is located within the inner tube but not at the bottom thereof and which inner tube additionally has a lower inner area at the bottom of the inner tube to aid in heat distribution during incubation.

BRIEF DESCRIPTION OF THE DRAWINGS

The objectives and principles of the invention and the preferred embodiments thereof will best be understood by reference to the accompanying drawings wherein:

FIG. 1 is a side view of an embodiment of the particle washing system prior to the insertion of the inner tube into the outer tube.

FIG. 2 is a side view of the particle washing and collecting system shown in FIG. 1 following insertion of the inner tube into the outer tube.

FIG. 3 is a cross sectional view of the inner tube of the particle washing and collecting system of FIG. 1.

FIG. 4 is a side view of another alternative embodiment of the particle washing and collecting system.

FIG. 5 is a side view of yet another alternative embodiment of the particle washing system.

Figure 8:
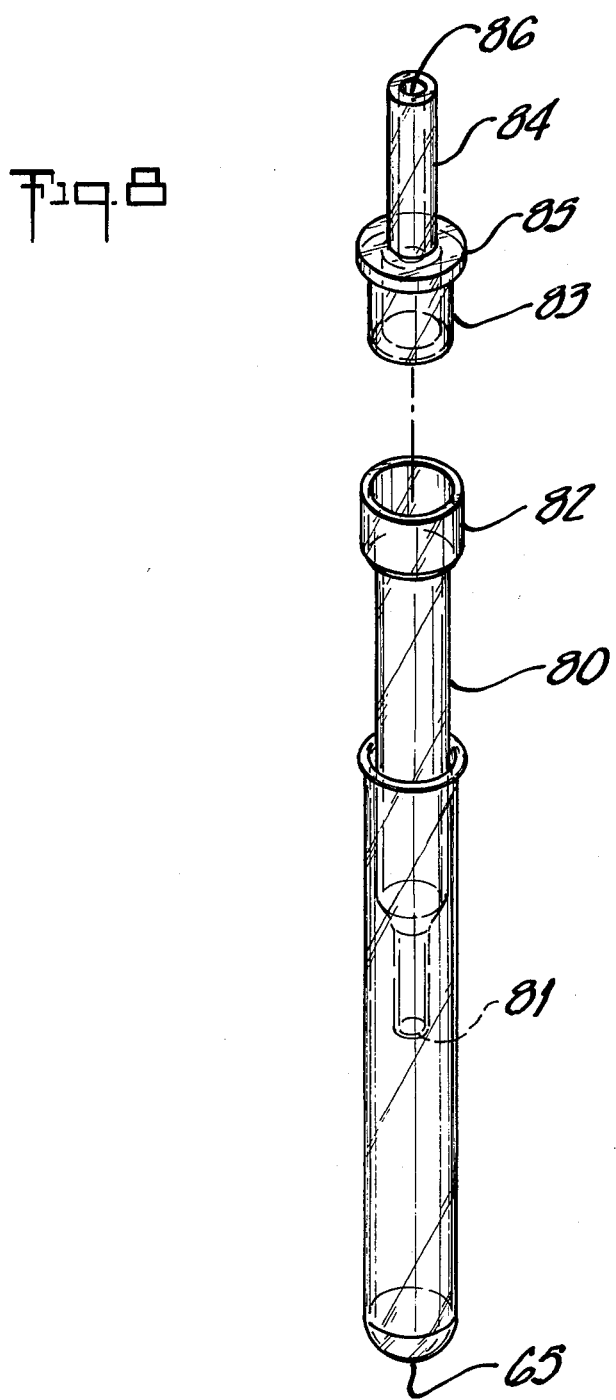

FIG. series 6 show side views during operation of a preferred embodiment of the particle washing system.

FIG. 7 is a side view of still another alternative embodiment of the particle washing system.

FIG. 8 is an exploded side view of the most preferred embodiment of the particle washing system.

BEST MODE FOR CARRYING OUT THE INVENTION

The present invention describes a method and device including a washing reagent for permitting the separation of particles within a fluid such that during separation, the particles are washed of any contaminants from the mother solution. Further, the invention will permit the removal of the mother solution remaining after separation of the particles, i.e., the supernatant, with a minimal of mixing and resulting contamination between the supernatant and the desired particles.

FIG. 1 illustrates an embodiment of such a device showing an inner tube 21 wherein the mother solution 22, containing the particles to be separated, is placed. The inner tube 21 preferably has a larger diameter portion 24 at the top of the tube such that after insertion within the outer tube or receptacle means 25, the larger diameter section 24 prevents further insertion of the inner tube 21 into outer tube 25 and additionally provides a grasping surface for facilitating removal of the inner tube following centrifugation. Inner tube 21 further supports at the bottom of the tube a flow restrictor 23. The flow restrictor is sufficiently permeable so as to allow passage of the particles contained within the mother solution 22. In an alternative embodiment, the flow restrictor means 23 is an insoluble porous matrix or filter type material having apertures and channels of a diameter at least equal to the diameter of the particles contained in the mother solution. The matrix or baffle is preferably composed of a plastic type material having an appropriate wetting coefficient to maximize the separability of the mother and washing solutions. Thus, for the separation of red blood cells having a diameter of 7 microns, one would use a baffle having a minimal pore diameter of 7 microns. Preferably, to decrease sedimentation times as well as to reduce mechanical deformation of the red blood cell as it passes through the baffle, it has been found advantageous to employ a baffle having a larger pore diameter than the diameter of the red blood cells to be separated.

Washing solution 26 is preferably chosen to have a density greater than that of mother solution 22 and additionally, must be compatible with the particles to be separated. For example, if the particles are erythrocytes, compatibility in the sense used means that the outer wash solution can not lyse the red blood cells nor interfere with serological or immunological reactions. Ideally, such a solution would be composed of bovine serum albumin (BSA) at a 4–15% concentration in a salt solution to prevent lysis. Typically, in a Coombs Test, the mother solution 22 would ideally be composed of two parts of patient's serum, two parts of potentiator such as ORTHO TM Antibody Enhancement Solution (OAES, a low ionic strength additive solution which increases the rate at which antibodies interact with red cell antigens) available from Ortho Diagnostic Systems Inc., U.S. Route #202, Raritan, N.J. 08869; one part of Alsever's or saline solution containing 3% red blood cells. These reactants will have a specific gravity at room temperature of approximately 1.014 to 1.019. The following provide an outer wash solution 26 of the correct density, serological and immunological properties for separating and collecting red blood cells: 4%

BSA/1.2% NaCl (1.016), 7% BSA/1.2% NaCl (1.030), 15% BSA/1.2% NaCl (1.048), 5% sucrose/0.9% NaCl (1.025), 6% sucrose/0.9% NaCl (1.029) and 10% glycine/0.9% saline (1.047) where the specific gravities at room temperature are given in parentheses. It has been further observed that if the saline concentration is increased slightly to form a hyperosmotic solution with respect to the cells, then the cells will crenate thereby becoming more dense and consequently, will be more responsive to the application of centrifugal force. Should a different force be employed such as an electrical or magnetic force (for example, a magnetic field imposed on particles having a magnetic dipole or labeled with a magnetic material), then the outer wash solution will be adjusted appropriately to avoid interfering effects. The greater density of the surrounding outer solution 26 acts in concert with the flow restrictor to diminish the flow of the inner mother solution 22 into the surrounding fluid during centrifugation and thereby substantially reduce contamination of the outer wash solution 26. Although these considerations are presented in conjunction with FIG. 1, it is to be understood that they apply generally to all embodiments.

With reference to FIG. 2, following insertion of the inner tube 21 into outer tube 25 to the extent permitted by increased diameter 24 on inner tube 21, the outer solution 26 is preferably displaced by both inner tube 21, solution 22 and the flow restrictor 23 such that the surface of outer fluid 26 rises to a level above that of inner solution 22 before the levels equalize. Such an arrangement of surface levels is preferred so as to further restrict the mother solution from mixing with the outer solution since the interface between these two solutions will be contained within inner tube 21. The particle washing device as depicted in FIG. 2 is now ready for centrifugation wherein force, directed toward point 27, will be exerted upon the particles contained within solution 22 to cause them to move through the orifices and channels of the flow restrictor 23 and subsequently through outer solution 26 to the bottom 27 of outer tube 25. As the particles pass through outer solution 26, any contaminants occasioned by solute drag or nonspecifically attached to or on the surface of the particle will be washed and removed as the particle passes through outer solution 26. Centrifugal forces are chosen so as to adequately force the movement of the particles in the desired direction and result in a packing or sedimentation at point 27 in the outer tube 25 but not so great as to result in physical deformation of or damage to the particles. The distance between flow restrictor 23 and sedimentation point 27 is advantageously chosen so as to maximize the washing of the particles to be separated from mother solution 22 yet still provide for a minimum time for separation. Further, the volume of solution 26 is ideally chosen so as to result in a great dilution of any contaminants that pass through the flow restrictor 23. The effectiveness of this embodiment will be greatly reduced if the particles are permitted to agglutinate and form complexes which are larger than the pores diameters.

FIG. 3 is a cross-section of the particle washing device as shown in FIG. 1 wherein, increased diameter portion 24, inner wall 21 and flow restrictor 23 are depicted.

To accomplish the desired objective of minimal contamination due to physical mixing of the separated particles and the mother solution, a flow restrictor is preferably inserted between the mother solution and the outer solution. This flow restrictor serves to stabilize the two fluids and to minimize mixing due to convection, countercurrents due to density gradients or other currents induced by physical movement of inner tube 21 with relation to outer fluid 26. Consequently, the flow restrictor is preferably chosen so as to allow movement of the particles through the flow restrictor yet minimize the amount of mixing between the inner solution 22 and the outer solution 26. It will be apparent to those in the field that the effect created by this fluid flow restrictor or stabilizing device can be alternatively accomplished by increasing the surface tension normally present at the interface between the two mixtures. Such a surface tension multiplier could be effected by physical structure such as a reduced orifice opening diameter 45 of the inner tube 41 as in FIG. 4 or alternatively, could be induced by applications of chemicals or a chemical coating at this level of the inner tube.

Following centrifugation or application of other electrical or magnetic force, the desired particles contained within the mother solution will have been forced through the flow restrictor 23, through the outer solution 26 and to the bottom of the outer tube 27 where they preferably will be sedimented. At this point, the inner tube containing the remaining mother solution supernate and the flow restrictor is preferably removed in a fashion to minimize physical agitation of the outer solution and thus minimize resuspension of the sedimented particles. An advantage provided by the inner tube is that it allows removal of the mother solution which coats the sides of the container in which it is placed. By removing the inner tube, this potential source of contamination is quickly and efficiently removed so as to prevent contamination of the particles when they are resuspended. The outer solution, in a position atop the sedimented particles, can be removed by techniques well known in the art such as decantation, siphoning and the like.

FIG. 4 depicts another embodiment wherein inner tube 41 is constructed with a reduced opening 45. Inner tube 41 is dimensioned physically to fit within outer tube 43 and to rise at least above the level of the outer wash solution 26 following the addition of the particulate containing solution 22 within the inner chamber of tube 41. Inner tube 41 is further supplied with an air vent 44. The air vent is effective in permitting the escape of the larger bubble which would otherwise be trapped in lower inner area 42 upon the insertion of inner tube 41 into the outer solution 26. The air vent, however, will preferably help maintain the smaller air bubble in orifice 45 which advantageously serves to aid in maintaining separately the mother and outer wash solutions prior to centrifugation. Preferably, the diameter of the orifice 48 of air vent 44 is dimensioned to allow free communication between lower inner area 42 and the atmosphere. The air vent is of further advantage in preventing inadvertant passage of mother solution 22 through orifice 45 upon accidental upward motion of inner tube 41. The air vent will ideally permit the movement of outer solution 26 into the lower inner area 42 formed by the collar 49 of inner tube 41 thus facilitating heat transfer from outer solution 26 to inner solution 22 at the lower, reaction chamber portion 46 of inner tube 41. Such a heat transfer is advantageous in those reactions requiring incubation of the mother solution and other reactants as is desired prior to a Coomb's Test in a cross-match or an antibody detection procedure. In the preferred embodiment, inner tube 41 rests freely upon outer tube 43. The application of force will advantageously result in the movement of particles through orifice 45 to the bottom 47 of outer tube 43. The distance between orifice 45 and point 47 is advantageously chosen to reduce the outer wash solution 26 volume to a minimum as well as to maximize heat transfer yet still attain maximum washing of particles and dilution of contaminants. Orifice 45 will advantageously be located in tube 41 so that all particles will pass through it even if the force applied is not precisely aligned with the central longitudinal axis of inner tube 41. Such a situation would occur, for example, if the invention were placed in a centrifuge having a rotor which did not permit a full 90° movement of test tube 43 during rotation of the rotor. In an alternative arrangement, shown in FIG. 5, the inner tube, replaced with hollow cylinder 51, is inserted within outer tube 53 and rests freely upon the bottom thereof. The length of the inner tube must be sufficient so as to rise above the level of the outer washing solution following the addition of the particulate containing solution to the interstice of cylinder 51.

FIGS. 6A, 6B and 6C depict a preferred embodiment at different stages during use. Specifically, FIG. 6A shows inner tube 62 and outer tube 63 prior to the insertion step. FIG. 6D is a cross-section of inner tube 62. Outer tube 63 has been shown proportionately larger than inner tube 62 for clarity. Inner tube 62 has a reduced orifice and channel 64 for substantially separately maintaining the mother solution 69 from flowing into lower chamber 61 and ultimately into the wash solution 70. Lower chamber 61 further serves to aid in heat transfer during those procedures requiring an incubation step. Inner tube 62 is further supplied with support notches 67 or in the alternative a support ridge 68 (both shown in drawing 6A) for support within outer tube 63. Inner tube 62 further has at the bottom of chamber 71, a funnel type arrangement having an angle alpha associated leading to the reduced orifice and channel 64. This funnel type shape is preferably designed so that the particles are directed to the reduced orifice upon centrifugation irregardless that the rotor in the centrifuge is incapable of extending a full 90 degrees upon rotation. Consequently, it has been found advantageous that angle alpha should be less than twice the angle of the test tube during rotation permitted by the rotor. Inner tube 62 is advantageously constructed of a plastic material such as polyethylene, polystyrene or polypropylene. Also shown is outer tube 63 having an outer outer wash solution 70. FIG. 6B shows a comparison of outer wash solution 70 and inner particulate containing fluid level 69 after insertion of the inner tube 62 into the outer tube 63 but prior to centrifugation. The relatively higher level of outer wash solution 70 as compared to inner mother solution 69 aids in maintaining separately the two solutions. FIG. 6C indicates the levels attained following centrifugation and the deposition of the particles to be collected and washed at lower point 65 in outer test tube 63. Although inner tube 62 is shown to be substantially the same length as outer tube 63, the inner tube may be constructed with greater length dimensions to aid in its facile removal following centrifugation.

FIG. 7 depicts yet another alternative embodiment wherein inner tube 71 is dimensioned to be insertable into outer tube 73 and is further constructed to accomodate, in sealing fashion at a lower portion thereof, a flow restrictor in the form of a baffle 74 composed of a porous plastic. Inner tube 71 has an additional flow restrictor at the bottom of it in the form of a restricted opening 75. In the intervening space between the baffle 74 and opening 75, the particles are washed by outer washing solution as they pass through to the bottom of outer tube 73.

FIG. 8 depicts the most preferred embodiment of the present invention particularly useful for separating particles from large volumes of mother solution as well as for separating particles of differing densities. Although the FIG. 8 embodiment is shown at a scale of approximately 1—1 to the actual device employed in Example 3, the embodiment shown is by no means limited to such size but may be scaled up appropriately in order to handle large volumes of particle containing fluid such as blood. Using blood as an example of the operation of the FIG. 8 device, red blood cells are still to be sedimented at the bottom 65 of the outer test tube and through the wash solution contained therein. The separating device (inner tube) 80 is inserted into the wash solution, and the mother solution added to the interior of the inner tube. As described before, the application of appropriate force causes the particles to move in a generally downward direction toward end point 65 through the fluid flow restrictor means and orifice 81.

Inner tube 80 has an expanded portion 82 for supporting inner tube 80 within the test tube and for preferably maintaining orifice 81 at some point distant from the bottom of outer test tube 65. This permits the accumulation of large red blood cell deposits at point 65 without mechanical interferance from inner tube 80. It is to be especially noted that the outer wash solution may be either a fluid with an appropriately selected density intermediate the density of the multiple particles contained within the mother solution and the mother solution or alternatively, may be a gradient density having the most dense portion near bottom 65 and becoming less dense toward the top of the outer tube. Thus, particles of mixed densities within a mother solution may be individually separated during centrifugation in accordance with the selected density of the outer solution or the density gradient.

By appropriate selection of volumes and densities for example, red blood cells may be deposited at point 65 and separated from the lymphocyte portion of the white blood cells which are substantially maintained within inner tube 80 for easy removal and subsequent dispensing. Top portion 84 is particularly useful for removing the mother solution and/or intermediate density layers contained within inner tube 80. Following centrifugation, section 83 of cap means 84 is inserted into expanded portion 82 of the inner tube in a preferably removable but tight sealing fit. Insertion is ideally limited by an expanded portion each as shown by extension 85 of top portion 84. The top portion 84 has continuous therethrough a lumen 86 which is sealable by finger pressure. Thus, the inner tube 80 can be removed with top portion 84 without loss of the fluids and/or particles contained therein and with a minimal of physical agitation to the particles deposited at point 65 of the outer tube. The relatively smaller lumen 86 permits finger control dispensing of the inner fluids from inner tube 80 so that, for instance, the lymphocyte white blood cell layer may be dispensed in one or two drops through orifice 81 separately from other particles such as the erythrocytes at outer point 65. The present invention is additionally useful in providing a thorough washing of blood prior to transfusions to potentially reduce the risk of infection due to the prescence of viruses, bacteria or

EXAMPLES

1. Example for Antibody Detection Using the Embodiment Shown in FIG. 5

An inner hollow tube, open at both ends, having a diameter of 4 mm and a length of approximately 90-95 mm was inserted into a clear and transparent 10×75 mm test tube containing 1.5 ml of wash solution comprising 7% Bovine Serum Albumin in 1.2% NaCl having a specific gravity of 1.030. A 150 μl sample of reactants having a specific gravity at room temperature of approximately 1.014 to 1.019 comprising 2 parts patient serum, 2 parts potentiator (ORTHO TM Antibody Enhancement Solution) and 1 part of 3% human red blood cells (SELECTOGEN TM) in saline, separately incubated in a 37° C. water bath for 10 minutes, was introduced into the inner hollow tube. The entire system was placed in a SEROFUGE (trademark of Clay-Adams) centrifuge and spun at 3400 r.p.m. for approximately 30-60 seconds (900-1000 rcf) causing the red cells to sediment at the bottom. The entire contents of the outer tube was decanted in one step by inverting and the fluid adhering to the lip of the outer tube was removed by contact with an absorbent paper towel. Two drops of ORTHO TM Anti-Human Serum (Coomb's serum) was added to the sedimented cells, resuspension and mixing was effected by gentle agitation and the tube and contents were recentrifuged for 15 secs. in like manner as previously described. While resuspension was being effected, observation for saline agglutination was carried out in accordance with the procedures set by the American Association of Blood Banks. After centrifuging the serological reactions were read. Following the reading, a Coomb's control test was performed to ensure that the cells had been properly washed and free of serum contaminents that would neutralize the Coomb's serum. The control test was performed by adding 1 drop of IgG coated red blood cell reagent, mixing, and centrifuging for 15 seconds as previously described. This test ensures that the cells have been properly washed and are free of serum contaminants that would neutralize the Coombs Serum. Following a similar procedure for testing the effectiveness of the device using eight different sera (including examples of anti-$Fy^a$, anti-c, anti-D, anti-$Le^a$, anti-Kell obtained from the AABB-accredited Philip Levine Reference Laboratory of Ortho Diagnostic Systems Inc.) at various dilutions, with 30 separate readings and over a range of 0 to $4^s$ (0-no agglutination to $4^s$-maximal agglutination) agglutination reactions; the device of the present invention gave one full reading better than the typical three-step manual washing technique in 23% of the positive readings and one full reading less sensitive in 3% of the positive readings.

2. Example of washing blood cells for elution procedures using the embodiment shown in FIG. 7.

Antibodies bound to antigens on red cells can be removed (eluted) by heating the cells in a 56° C. water bath for 10 minutes. In such operations it is essential to separate the cells from their antibody-containing serum or plasma to demonstrate whether recovered antibody was adsorbed to the red cells or was present from the residual serum and not properly removed by the washing procedure utilized.

A 10 ml sample of $Rh_o$(D) negative blood was centrifuged and the plasma removed. The cells were resuspended with an equal volume of plasma containing anti-D and divided into 1 ml aliquots. Each aliquot was centrifuged and the plasma removed. The cells were then resuspended with 0.15 M sodium chloride solution to a total of 3 ml including solution and cells and added to the inner tube of the device shown in FIG. 7. Outer tube 73 was a 16×100 millimeter tube, inner tube 71 was an 11×70 millimeter tube containing a porous plastic filter 74 having a pore size of 70 microns and having an outer wash solution contained within outer tube 73 composed of 6.4 ml of 12% bovine albumin. The device was centrifuged at 2000× g for 5 minutes, the inner tube was removed, and the outer wash solution was aspirated. The packed red blood cells at the bottom of the outer tube were resuspended by the addition of 0.5 ml of 5% bovine albumin and gentle mixing. The antibodies were then eluted by placing the red blood cells in a 56° C. water bath for 10 minutes, and then centrifuged as described earlier while still warm. Two drops of the eluate were incubated with $Rh_o$(D) positive cells for 30 minutes at 37° C. and following three washes with saline, the red blood cells were tested with antihuman globulin for the presence of antibody bound to the cells. A negative result in the test for anti-D in the eluate indicated efficient removal of anti-D from the cells in the apparatus of the present invention. In conventional washings, the 1 ml aliquots of red blood cells were diluted with an additional 8 ml of 0.15 M sodium chloride solution and washed from one to seven times and finally eluted into 0.5 ml 5% bovine albumin at 56° C. Comparison of results indicated that three to four conventional washing steps were required to remove the same amount of anti-D removed with the apparatus of the present invention in a one-wash step.

3. Example of washing blood cells using the most preferred embodiment shown in FIG. 8.

A plastic inner tube having a length of approximately 95 millimeters, a lower inner diameter of approximately 5 millimeters, and an upper internal diameter of approximately 10 millimeters with a 10 millimeter long collar was inserted into and suspended from the upper rim of a 16×100 mm glass test tube. The collar effectively prevented the lower end of inner tube from resting on the bottom of the glass test tube. The upper end of the inner tube was fitted with an adapter having a top portion with an internal diameter of approximately 3 mm and capable of being sealed with a finger tip.

8 ml of a dense Ficoll-Paque (a Pharmacia brand name product from the dextran family of polymers) solution was placed in the glass 16×100 mm test tube. Whole blood, previously collected and treated with heparin anticoagulant, was diluted 1-1 with saline. 4 ml of the diluted blood was carefully layered into the interior of the inner tube and onto the top of the dense Ficoll-Paque solution. The glass test tube was then inserted into an IEC clinical centrifuge fitted with a swing-out head and centrifuged for 30 minutes at top speed. Following centrifugation, various layers were observable. The red cells were deposited at the bottom of the glass test tube and a layer of white cells on top of the red cells was visible. Inside the inner tube, an interface was apparent. Using the finger tip adapter, the inner tube was removed from the glass test tube and the fractions contained within the inner tube were recovered dropwise into separate, clean test tubes. The fractions were examined microscopically following staining with Wright's blood stain, as well as by flow cytometry on an ELT-8 (available from Ortho Diagnostic Systems Inc.).

Pursuant to these examinations, the presence of white cells, predominantly granulocytes. superior to the red blood cells was confirmed as well as the presence of a few platelets. Within the inner tube at the interface between the two density layers (formed by the mother solution and the Ficoll-Paque solution) were white cells which were predominantly lymphocytes and platelets. Platelets could also be found occurring in various fractions superior to the white cells.

Although the invention has been illustrated by the foregoing examples, it is not to be construed as being limited to materials employed therein, but rather, the invention encompasses the entire generic area of particle separation and washing as hereinbefore disclosed. It will be apparent to the skilled worker in this field that various modifications and embodiments of this invention can be made without departing from the spirit and the scope thereof.

What is claimed is:

1. A method for washing and collecting particles having a particular density or sedimentation rate from a population of particles and contained in a first fluid for use with a system comprising 1) an outer centrifuge tube having an open top end and a closed bottom end for containing a wash solution and 2) an inner tube, insertable into said outer tube, said inner tube forming a chamber for receiving fluids and having an upper portion with a first diameter and a lower portion with a second diameter smaller than said first diameter but sufficiently large so that substantially all fluids placed in said chamber will freely flow therethrough solely on the basis of normal gravitational forces, said chamber being funnel shaped between said first and second diameters whereby a smoothly decreasing wall diameter is formed from said first to said second diameters, said method comprising the steps of:
   placing in said outer tube a wash solution having a density at the minimum substantially equal to that of the first fluid and intermediate the density of at least two different particles contained in the first fluid;
   inserting said inner tube into said outer tube containing the wash solution whereby the wash solution level rises to be a level within the inner tube;
   layering said first fluid containing the particles to be washed and collected in said inner tube chamber on top of said wash solution thereby forming an interface in said inner tube and a centrifuge combination;
   centrifuging said centrifuge tube combination for moving at least one of the different particles through said wash solution to a level where the density of said second fluid is substantially the same as that of the particles; and
   if said particles have moved out of said inner tube, removing said inner tube, the first fluid and the second fluid as required whereby the desired particles are obtained; or
   if said desired particles are contained within said inner tube, removing said inner tube with said first and second fluids contained therein and dispensing said first and second fluids whereby the desired particles are obtained.

2. The method as described in claim 1 wherein said wash solution has at least one component for adjusting the density of said wash solution selected from the group consisting of sodium chloride, glycine, sugards, serum albumin, natural polymers, natural copolymers, synthetic polymers, synthetic copolymers, dextran, and neutral polymers of sucrose.

3. The method as described in claim 1 wherein said wash solution is a dextran polymer having a density substantially intermediate the density of red blood cells and the density of white blood cells and if said particles are contained within said inner tube, the method further comprises the step of engaging an adaptor with the upper portion of said chamber in sealing fashion, said adaptor having a finger-sealable lumen extending therethrough for dispensing said first fluid and wash solution to obtain the desired particles in response to venting by altering finger pressure.

4. Apparatus for collecting and washing desired particles from a population of particles, with differing densities or differing sedimentation rates and contained in a first fluid, with a wash solution having a density at the minimum substantially equal to that of the first fluid and intermediate the densities of at least two different particles comprising the population, said system comprising:
   an outer tube for containing said wash solution and having an open top end and a closed bottom end;
   an inner tube, insertable into said outer tube, said inner tube for receiving fluids and having an upper portion with a first diameter and a lower portion with a second diameter smaller than said first diameter but sufficiently large so that substantially all fluids placed within said inner tube will freely flow therethrough solely on the basis of normal gravitational forces, said upper portion and said lower portion having a chamber therebetween, said chamber being funnel shaped between said first and second diameters whereby a smoothly decreasing wall diameter is formed from said first to said second diameters;
   support means for maintaining said inner tube above said closed bottom end of the outer tube; and a control cap means for engaging the upper portion of said inner tube in sealing arrangement and having a finger sealable lumen extending therethrough for communicating with said inner tube whereby said first fluid and wash solution may be dispensed from said inner tube in response to altering finger sealing pressure.

5. The system as provided in claim 4 wherein said support means is a collar associated with the top of said inner tube, said collar being of a shape and size for limiting insertion of the inner tube into the outer tube.

* * * * *